United States Patent [19]

Chen et al.

[11] Patent Number: 4,769,165

[45] Date of Patent: Sep. 6, 1988

[54] PROCESS FOR SYNTHESIS OF FERROMAGNETIC CHROMIUM DIOXIDE

[75] Inventors: Horng-Yih Chen, Chadds Ford, Pa.; Terry G. Crandall, Wilmington; James W. Bertoncino, Hockessin, both of Del.

[73] Assignee: E. I. Du Pont de Nemours and Company, Wilmington, Del.

[21] Appl. No.: 105,763

[22] Filed: Oct. 6, 1987

Related U.S. Application Data

[63] Continuation-in-part of Ser. No. 2,311, Jan. 20, 1987, Pat. No. 4,698,220, which is a continuation-in-part of Ser. No. 845,733, Mar. 28, 1986, abandoned.

[51] Int. Cl.[4] .......................................... C01G 37/027
[52] U.S. Cl. .................................. 252/62.51; 423/607
[58] Field of Search ..................... 252/62.51; 423/607

[56] References Cited

U.S. PATENT DOCUMENTS

| | | | |
|---|---|---|---|
| 3,278,263 | 10/1966 | Cox ........................................ | 23/145 |
| 3,512,930 | 5/1970 | Bottjer et al. .......................... | 23/145 |
| 3,911,095 | 10/1975 | Montiglio et al. ................... | 423/607 |
| 3,929,978 | 12/1975 | Morero et al. ....................... | 423/607 |
| 3,979,310 | 9/1976 | Montiglio et al. ................ | 252/62.51 |
| 4,045,544 | 8/1977 | Williston et al. ................... | 423/607 |

Primary Examiner—Jack Cooper

[57] ABSTRACT

Acetic acid is substituted for a portion of the chromic oxide employed in the hydrothermal reaction of chromium trioxide and chromic oxide to form ferromagnetic chromium dioxide.

4 Claims, No Drawings

PROCESS FOR SYNTHESIS OF FERROMAGNETIC CHROMIUM DIOXIDE

CROSS REFERENCE TO RELATED APPLICATIONS

This application is a continuation-in-part of U.S. patent application Ser. No. 002311 filed Jan. 20, 1987, now U.S. Pat. No. 4,698,220 which in turn is a continuation-in-part of U.S. patent application Ser. No. 845,733 filed Mar. 28, 1986, now abandoned.

BACKGROUND OF INVENTION

1. Field of Invention

This invention relates to the synthesis of ferromagnetic chromium dioxide and, more particularly, to a synthesis process in which acetic acid is used as a reducing agent.

2. State of the Art

Ferromagnetic chromium dioxide generally is manufactured by a two-stage process.

In the first stage, chromium trioxide ($CrO_3$) is dissolved in water. Particulate chromic oxide ($Cr_2O_3$) is then added to form a viscous paste in which the chromic oxide is partially dissolved and partially suspended. Dopants and crystal modifiers, such as iron and antimony, may be added in this stage to assist in obtaining the desired magnetic properties. The quantity of water selected is generally the minimum needed for the reduction and to limit the mass of paste that must be handled in the second stage.

In the second stage, the viscous paste is transferred to a reaction vessel, such as the annular can disclosed in U.S. Pat. No. 4,054,544, where it is heated under pressure to form acicular crystals of ferromagnetic chromium dioxide. Temperatures in the range of 300° to 400° C., and pressures in the range of 300 to 400 atmospheres are typically employed in the second stage.

Chromic oxide used in the process conventionally has been a fine-grained material obtained from thermal decomposition of ammonium dichromate. Large grained material generally has been avoided since undissolved grains serve as a nucleation site for chromium dioxide during the second stage, in competition with the desired nucleation sites provided by antimony or other seed crystal modifiers. Chromium dioxide formed on large grained chromic oxide has inferior magnetic properties compared to that formed on fine grained material.

The fine grained chromic oxide is very expensive and the ammonium dichromate decomposition process must be carefully controlled to avoid a runaway explosion. Thus, it is desirable to reduce the relative proportion of chromic oxide used in the manufacture of ferromagnetic chromium dioxide. Patent application Ser. No. 002311 describes such a process in which certain organic reducing agents are used to replace some or all of the chromic oxide in a partitioned reduction process. In one embodiment acetic acid is employed, in conjunction with an organic reducing agent having a C6 to C12 backbone, to adjust the relative percentage of the reduction that occurs during the first and second stages of the reduction process.

While excellent results are obtained when using the partitioned reduction process, there is a need to provide cooling during the first stage to prevent the temperature from prematurely rising above stage one conditions.

SUMMARY OF THE INVENTION

It now has been found that acetic acid maybe substituted with advantage for a portion of the chromic oxide normally employed in the manufacture of ferromagnetic chromium dioxide. Acetic acid is water soluble, and is conveniently added in the make-up water during stage one preparation of paste. Acetic acid will react exothermally with, and reduce, chromium trioxide as the paste reaches temperatures in the order of approximately 110° C. to 140° C. during heating to the final stage 2 reaction temperature, thereby providing a uniform heat boost throughout the paste. Thus, the present invention provides a process for the preparation of ferromagnetic chromium dioxide consisting essentially of:

(a) forming an aqueous paste containing approximately 100 parts chromium trioxide, 8 to 42 parts chromic oxide, 26 to 56 parts water, and 1 to 7 parts dissolved acetic acid, by weight, and (b) heating the paste to a temperature of approximately 300° to 400° C. under a pressure of at least approximately 250 atmospheres.

Chromium dioxide obtained in practicing the invention has a lower aspect ratio, improved friability, and a higher surface area than that typically obtained in the conventional two stage process. Magnetic tape produced using this chromium dioxide has lower noise and higher packing density, and is ideally suited for audio, video, and data tape applications.

DETAILED DESCRIPTION OF THE INVENTION

The principal reaction in a conventional process for the production of ferromagnetic chromium dioxide may be represented by the general formula:

$$CrO_3 + Cr_2O_2 \rightarrow CrO_2 + O_2$$

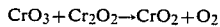

It now has been found that acetic acid affords unique advantages when substituted for a portion of the chromic oxide ($Cr_2O_3$) conventionally added as a fine-grained particulate material during the preparation of "paste" that is subsequently heated, under pressure, to prepare chromium dioxide. Acetic acid functions to reduce a portion of the chromium trioxide to the $Cr^{+3}$ ion. For purposes of describing the invention, it is convenient to express the reduced species as chromic oxide, while in fact it is a soluble form of $Cr^{+3}$.

In practicing the invention, the acetic acid is compounded with chromium trioxide, chromic oxide, and water to form a paste. The chromic oxide should be fine particulate material, and typically will be obtained from the thermal flash decomposition of ammonium dichromate, exhibiting a specific surface area of 40 to 55 $m^2/g$. Small particulate chromic oxide is employed since all the particles may not dissolve in the paste, and any remaining undissolved particles will function as nucleation sites during the subsequent preparation of ferromagnetic chromium dioxide. Coarse particles of chromic oxide will produce coarse chromium dioxide crystals, thereby broadening the crystal size distribution and causing the magnetic properties to deteriorate. If desired, however, a relatively inexpensive coarse grained chromic oxide may be added until the solubility limits are approached, at which time the remaining chromic oxide will be added in fine particulate form described above.

The ratio of chromium trioxide to total chromic oxide in the finished paste (i.e., that added in particulate form, plus that generated in situ by acetic acid) may be adjusted to obtain the desired chromium dioxide aspect ratio. Higher aspect ratios generally are obtained as the ratio increases. Higher coercivity values (Hc) generally are associated with higher aspect ratios, but other advantages of the process, such as improved product friability, diminish as the aspect ratio increases.

The practical useful range of chromium trioxide to total chromic oxide is approximately 2:1 to 4:1, by weight, corresponding to a $Cr^{+6}$ to $Cr^{+3}$ atomic ratio of approximately 1.5:1 to 3:1. There are no advantages to using ratios below 2:1, where an aspect ratio between 5 or 6 to 1 is achieved, but the process becomes increasingly costly to perform. At chromium trioxide to chromic oxide ratios above approximately 4:1, the aspect ratio will remain in the range of 10 to 12:1, with no further improvement, but other properties, such as friability, will continue to deteriorate.

The quantity of acetic acid selected is such that between 10% and 60% of the desired chromic oxide (i.e., $Cr^{+3}$ ion) is generated in situ as the acetic acid reacts with, and reduces, chromium trioxide while the paste is heated to the reaction temperature for production of chromium dioxide. Thus, a typical paste will contain approximately 100 parts chromium trioxide, 8 to 42 parts chromic oxide, 26 to 56 parts water, and 1 to 7 parts acetic acid. Magnetic properties generally will deteriorate if higher levels of acetic acid are selected, and the advantages of the invention generally will not be achieved at lower levels.

The quantity of water employed in the paste generally will vary from 0.7 parts to 1.8 parts per part of total chromic oxide. Below the minimum value, the paste becomes too viscous to mix properly and excessive amounts of chromium trioxide may remain undissolved. Undissolved chromium trioxide will adversely affect product uniformity. Above the maximum value, no further advantage is realized from more dilution, but productivity is adversely affected. In some instances, however, one might elect to use higher dilution levels, particularly if higher levels of acetic acid substitution are being employed and it was desired to use water as a heat sink to assist control of the exothermic acetic acid/chromium trioxide reaction.

Especially favorable results are obtained when the chromium trioxide to chromic oxide ratio is in the range of 2.5:1 to 3.0:1, and the quantity of acetic acid is such that approximately 15% to 25% of the desired chromic oxide is generated in situ by acetic acid. Overall water levels ideally are in the weight range of 1.0 to 1.3 parts per part of total chromic oxide, including that generated by the in situ reduction by acetic acid. These preferred ranges correspond to paste containing approximately 100 parts chromium trioxide, 22 to 32 parts chromic oxide, 30 to 39 parts water, and 1.4 to 2.6 parts acetic acid, by weight.

Nucleation agents and crystal modifiers, such an antimony oxide and iron oxide, are incorporated in the paste in conventional fashion to obtain the desired surface area and coercivity. Useful levels of antimony oxide will generally be in the range of 0.025% to 2.5% to the chromium dioxide product weight. Useful levels of iron oxide typically will be in the range of 0.1% to 5% of the chromium dioxide product weight. The antimony oxide is conveniently added either as a fine grained powder or as a solution in concentrated chromic acid as disclosed in U.S. Pat. No. 4,524,008 to Chen.

Pastes are most conveniently prepared by first dissolving or partially dissolving chromium trioxide particles, that typically have a specific surface area of 30 to 60 $m^2/g$, in water. The remaining ingredients are then added, with the proviso that the chromic oxide generally is added last. While acetic acid is a liquid at ambient temperature, it is conveniently added as a solution in a portion of the make-up water.

Temperature of the paste may elevate as the various ingredients are blended together, due to the heat of solution and heat generated by stirring. Since the acetic acid may be very slightly reactive at high concentrations and elevated temperatures, it may be preferred in some cases to delay its addition until near the end of the paste formation, after the paste has been allowed to cool somewhat.

The paste may be stored after its formation, or may be charged into a conventional reaction vessel, such as an annular can, for heating to reaction conditions. When the paste temperature reaches approximately 110° C., the acetic acid begins to exothermally react with and reduce chromium trioxide to the $Cr^{+3}$ valence state, providing a heat boost that aids in bringing the paste rapidly and uniformly to temperatures at which chromium dioxide is formed. The decomposition products of acetic acid are water and carbon dioxide, which do not adversely effect the process or magnetic properties of resulting ferromagnetic chromium dioxide.

Reduced chromium species that are formed as acetic acid reacts with the chromium trioxide remain in solution, even though the paste may be at its solubility limit before this reduction begins. Thus, a supersaturated condition exists which is not obtainable when starting from particulate $Cr_2O_3$ according to the known prior art. Complete solution of all chrome species is an important advantage of the present process. It provides for uniform distribution of ingredients through the paste volume at a resolution approaching molecular dimensions. In combination with similar distribution of additives, as taught in U.S. Pat. No. 4,340,494, and in combination with the reduced temperature gradient in the paste due to the uniform release of heat energy throughout the paste during the synthesis phase of reduction, conditions exist that are more favorable for uniform crystal growth and distribution than is obtainable by practicing the prior art. The narrower particle size distribution is evident in electron photomicrographs and may be confirmed indirectly. For example, the peak coercivity in a plot of coercivity versus surface area occurs at 37 $m^2/g$, whereas the coercivity peak for chromium dioxide made by the prior art using particulate $Cr_2O_3$ and additives occurs at about 30 $m^2/g$. This is strong evidence that the small side tail of the distribution, which is responsible for the decline in coercivity at high surface area, is reduced in size when practicing the process. The paste is converted to ferromagnetic chromium dioxide by heating to temperatures in the range of 300° to 400° C., under a pressure of at least approximately 250 atmospheres, as generally 300 to 400 atmospheres, is conventional in the art. Use of an annular can and reaction conditions described in U.S. Pat. No. 4,054,544, incorporated herein by reference, can be used to advantage.

Conventional nucleation agents, such as antimony oxide and tellurium oxide (U.S. Pat. Nos. 2,923,683 and 3,243,260), generally will be added in an effective amount during preparation of the paste along with iron dopant (U.S. Pat. No. 3,034,988). It is particularly advantageous to add these modifiers as a solution in aqueous chromium trioxide, as described in U.S. Pat. No. 4,524,008. Useful quantities of crystal growth modifier range from 0.025% to 2.5% based on the weight of $CrO_3$. Typical quantities for paste formulations with low ratios of $Cr(+6)$ to $Cr(+3)$ will be 0.025% to 0.5% and 0.5% to 2.5% where high ratios of $Cr(+6)$ to $Cr(+3)$ are targeted. Efficiency of the nucleation seed decreases as the $Cr(+6)$ to $Cr(+3)$ ratio increases.

It has been found that the aspect ratio of ferromagnetic chromium dioxide obtained from the process is a direct function of the ratio of soluble $Cr(+6)$ to soluble $Cr(+3)$ in the paste, and can be varied from approximately 10 or 12, to 6. Thus, the aspect ratio can be varied from that of the prior art, to approximately half of the prior art values. Low aspect ratio particles are readily obtained by employing a low ratio of $Cr(+6)$ to $Cr(+3)$ in the paste, which corresponds to a high degree of overall reduction. These low soluble ratios require supersaturated concentrations that are not attainable through the prior art. Chromium dioxide product containing low aspect ratio particles is notably friable, requiring less force to break up, has improved dispersibility in binder, and affords superior magnetic properties in audio, video, and data tape.

Particles produced according to the reduction process of the present invention can be further upgraded and stabilized by techniques known in the art. A variety of known binders, surfactants, antistatic agents, plasticizers, hardeners, etc. can be employed when the particles are used to produce magnetic recording elements such as audio and video tapes and data disks and tapes. Pertinent prior art patents include U.S. Pat. Nos. 3,529,930; 3,512,930; 4,045,544; 3,080,319; 3,558,492; 3,468,700; 3,397,072; 3,585,141; 3,926,826; 3,929,658; 3,929,659; 3,278,263 and 3,649,541.

It will be appreciated by those skilled in the art that the term "acetic acid" as used herein refers to acetic acid itself, as well as to compounds that form acetic acid in situ, such as acetic anhydride or metal acetate salts that do not contain ions that adversely affect magnetic properties of ferromagnetic chromium dioxide. Likewise, while the process has been described using $CrO_3$ as the source of hexavalent chromium, it will be apparent to those skilled in the art that other sources could be used. For example, it is contemplated that chromium salts such as sodium dichromate, when acidified with a strong acid such as sulfuric acid, could be employed in the production of paste in accordance with the invention.

Chromium dioxide that is produced in accordance with the invention has a relatively high surface area, typically in the range of 25 to 45 $m^2/g$, and a coercivity in the range of approximately 450 to 600. Due to the relatively large number of particles, and relatively narrow particle size distribution, it is possible to achieve higher than normal packing densities, and lower noise, in audio, video and data tapes made with the chromium dioxide.

The following examples serve to illustrate the practice of the present invention and beneficial results obtained during the process and improvements with the particles produced by the process.

EXAMPLE 1

Chromic acid (613.8 g less the amount present in antimony stock solution as described below) and distilled water (198.2 g less the amount present in antimony stock solution) were stirred on a Cowles Model 12 laboratory dissolver in a 1-liter stainless steel beaker. Next was added Iron oxide and an aliquot portion of an antimony oxide stock solution prepared as in Chen U.S. Pat. No. 4,524,008. The antimony solution assay was 5.88% $Sb_2O_3$, 58.8% $CrO_3$, and 35.3% $H_2O$. Various levels of each additive were used in a series of repeat preparations. In each case, the initial specified levels of chromic acid and water were adjusted downward to account for the amounts of each present in the antimony stock solution.

To the above partially dissolved mixture was added chromic oxide (155.5 g) and acetic acid (15.37 g). The mixture was then stirred vigorously for 20-30 minutes during which time the temperature was allowed to rise to 75° C. and the paste steadily increased in viscosity. The paste was removed from the Cowles dissolver and allowed to cool before being transferred to glass jars lined with Teflon ® sheeting and sealed by wiring shut the sheet pigtails.

The acetic acid present in the paste doesn't react significantly at the paste preparation stage. It reacts with chromic acid in the subsequent reactor step to produce additional $Cr^{+3}$. The level of acetic acid used was selected such that 25% of the final chromic oxide content was supplied by this means. The final $Cr^{+6}/Cr^{+3}$ ratio, including the $Cr^{+3}$ to be formed later via the acetic acid reaction, was 2.0:1.

In all, six paste preparations were made by this procedure and reacted as described in Cox, et al., U.S. Pat. No. 3,278,263 at high temperature and pressure to produce a relatively soft textured chromium dioxide. Particle properties for all six preparations are given in Table 1 along with the iron oxide and antimony oxide levels used. The levels of each additive are expressed as weight % based on the theoretical weight of chromium dioxide product.

TABLE 1

| SAMPLE | % $Sb_2O_3$ | % $Fe_2O_3$ | Hc, Oe | $\sigma s$, emu/g | $\sigma r$, emu/g | ssa, $m^2/g$ |
|---|---|---|---|---|---|---|
| 1 | 0.06 | 0.2 | 494 | 81.0 | 38.2 | 39.5 |
| 2 | 0.08 | 0.2 | 504 | 80.2 | 38.1 | 42.2 |
| 3 | 0.10 | 0.2 | 499 | 81.9 | 39.2 | 42.2 |
| 4 | 0.06 | 0.5 | 528 | 80.7 | 39.3 | 41.9 |
| 5 | 0.08 | 0.5 | 510 | 80.4 | 38.0 | 43.8 |
| 6 | 0.10 | 0.5 | 534 | 79.1 | 38.1 | 47.3 |

The magnetic properties of all six samples are well within the range of commercial utility. Furthermore, the samples exhibit superior particle softness. With respect to surface area, the levels achieved are somewhat higher than for preparations made at equivalent levels of antimony oxide and via the prior art as currently practiced commercially.

EXAMPLE 2

A series of eight pastes were made, using the general procedure of Example 1, for the purpose of demonstrating useful ranges of acetic acid and paste water level. The acetic acid levels were selected to provide a final $CrO_3$:$Cr_2O_3$ ratio of 2:1 by weight (3:1 molar) after completion of the acetic acid reduction of $CrO_3$. The % acetic acid column represents the percentage of total $Cr_2O_3$ derived from acetic acid reduction of $CrO_3$. The levels of $Sb_2O_3$ and $Fe_2O_3$ represent 0.01% and 0.5% of the theoretical $CrO_2$ product weight, and $Sb_2O_3$ was added as a solid rather than as a stock solution as described in Example 1. Ingredient weights in grams are given below for each case.

| RUN | WATER | % HOAc | $CrO_3$ | $Cr_2O_3$ | $Sb_2O_3$ | $Fe_2O_3$ |
|---|---|---|---|---|---|---|
| 1 | 147 | 6.4 | 459 | 193.5 | 0.60 | 3.0 |
| 2 | 143 | 12.8 | 488 | 172 | 0.60 | 3.0 |
| 3 | 139 | 19.1 | 516 | 150.5 | 0.60 | 3.0 |
| 4 | 272 | 12.8 | 488 | 172 | 0.60 | 3.0 |
| 5 | 268 | 19.1 | 516 | 150.5 | 0.60 | 3.0 |
| 6 | 265 | 25.5 | 544 | 129 | 0.60 | 3.0 |
| 7 | 261 | 31.9 | 573 | 107.5 | 0.60 | 3.0 |
| 8 | 257 | 38.3 | 601 | 86 | 0.60 | 3.0 |

The first three pastes represent a low level of paste water content (overall $CrO_3:Cr_2O_3:H_2O = 2:1:0.70$ by weight, including water of reaction from oxidation of acetic acid). These pastes were all readily stirrable. At completion of the paste cycle minor amounts of undissolved $CrO_3$ flakes were observed, but they appeared to have no adverse effect on the eventual product quality. The remaining samples represent a high level of paste water content (overall $CrO_3:Cr_2O_3:H_2O = 2:1:1.3$ by weight). No undissolved $CrO_3$ was observed in these cases.

After reactor conversion, all samples yielded soft $CrO_2$ with the magnetic and surface area properties given in Table 2. Commercially useful properties were obtained at each extreme of acetic acid level and paste water level. Values intermediate between these extremes can logically be expected to also afford commercially useful properties.

TABLE 2

| SAMPLE | PARTS WATER | % HOAc | Hc, Oe | σs, emu/g | σr, emu/g | ssa, m²/g |
|---|---|---|---|---|---|---|
| 1 | 0.7 | 10 | 526 | 80.6 | 39.1 | 28.9 |
| 2 | 0.7 | 20 | 403 | 84.4 | 38.8 | 22.3 |
| 3 | 0.7 | 30 | 453 | 81.5 | 38.3 | 26.3 |
| 4 | 1.3 | 20 | 509 | 81.5 | 39.4 | 28.6 |
| 5 | 1.3 | 30 | 507 | 82.1 | 39.0 | 29.6 |
| 6 | 1.3 | 40 | 510 | 81.0 | 38.1 | 38.0 |
| 7 | 1.3 | 50 | 506 | 78.1 | 36.8 | 46.4 |
| 8 | 1.3 | 60 | 485 | 77.8 | 36.6 | 47.4 |

EXAMPLE 3

Several pastes were made using the general procedure of Example 2, except that the $CrO_3:Cr_2O_3$ ratio varied from 2:1 to 3.6:1 and paste water level varied from 0.86 parts to 1.20 parts. The $Sb_2O_3$ level ranged from 0.10% to 0.216%, and $Fe_2O_3$ varied from 1.4% to 2.0% based on the theoretical weight of $CrO_2$ formed. Recipe conditions and particle results are given in Table 3.

TABLE 3

| SAMPLE | $CrO_3:Cr_2O_3:H_2O$ | % HOAc | % $Sb_2O_3$ | % $Fe_2O_3$ | Hc Oe | ssa m²/g |
|---|---|---|---|---|---|---|
| 1 | 2:1:0.86 | 40 | 0.10 | 2.0 | 542 | 33.8 |
| 2 | 2:1:0.86 | 35 | 0.10 | 2.0 | 506 | 26.0 |
| 3 | 2:1:0.86 | 25 | 0.10 | 2.0 | 522 | 25.8 |
| 4 | 2:1:0.86 | 30 | 0.15 | 2.0 | 490 | 25.8 |
| 5 | 2:1:0.86 | 20 | 0.15 | 2.0 | 517 | 28.3 |
| 6 | 2:1:0.86 | 10 | 0.15 | 2.0 | 541 | 24.8 |
| 7 | 2.63:1:1 | 40 | 0.21 | 1.4 | 522 | 49.9 |
| 8 | 2.63:1:1 | 20 | 0.21 | 1.3 | 602 | 29.1 |
| 9 | 2.63:1:1 | 25 | 0.05 | 1.4 | 499 | 22.9 |
| 10 | 2.63:1:1 | 20 | 0.05 | 1.4 | 520 | 21.6 |
| 11 | 2.63:1:1 | 15 | 0.05 | 1.4 | 523 | 21.3 |
| 12 | 3.6:1:1.2 | 60 | 0.15 | 2.0 | 458 | 46.7 |
| 13 | 3.6:1:1.2 | 50 | 0.15 | 2.0 | 434 | 42.0 |
| 14 | 3.6:1:1.2 | 40 | 0.15 | 2.0 | 480 | 41.0 |
| 15 | 3.6:1:1.2 | 30 | 0.15 | 2.0 | 605 | 31.9 |
| 16 | 3.6:1:1.2 | 0 | 0.15 | 2.0 | 621 | 24.1 |

The particle properties are seen to vary over a wide range in response to the reported variations in recipe conditions. Moreover, the range is eminently appropriate for commercially useful products.

Generally, increasing the use of acetic acid results in higher surface area. Above 20-30% acetic acid it also causes coercivity to decrease. Increasing the $CrO_3:Cr_2O_3$ ratio increases coercivity and decreases the sensitivity of the ssa response to $Sb_2O_3$ level. Additives ($Sb_2O_3$ and $Fe_2O_3$) have the expected effect on coercivity and ssa, although the sensitivity to $Sb_2O_3$ level increases as the acetic acid level increases.

EXAMPLE 4

A series of eight pastes were made using the general procedure of Example 2 except that the $CrO_3:Cr_2O_3$ ratio was fixed at 4:1 and the water content was either 1.2 or 1.8 parts per total part $Cr_2O_3$. The dosages of $Sb_2O_3$ and $Fe_2O_3$ were as in Example 2. The results are reported in Table 4. As in previous examples, the % HOAc column refers to the percentage of total $Cr_2O_3$ content supplied by acetic acid reduction of $CrO_3$.

TABLE 4

| SAMPLE | PARTS $H_2O$ | % HOAc | Hc, Oe | σs, emu/g | σr, emu/g | ssa, m²/g |
|---|---|---|---|---|---|---|
| 1 | 1.2 | 10 | 365 | 87.2 | 34.7 | 7.1 |
| 2 | 1.2 | 20 | 426 | 83.2 | 38.8 | 15.3 |
| 3 | 1.2 | 30 | 387 | 85.5 | 36.2 | 16.6 |
| 4 | 1.8 | 20 | 200 | 87.0 | 26.4 | 5.1 |
| 5 | 1.8 | 30 | 200 | 87.8 | 26.3 | 5.6 |
| 6 | 1.8 | 40 | 286 | 86.6 | 32.9 | 8.7 |
| 7 | 1.8 | 50 | 379 | 83.2 | 36.0 | 13.0 |
| 8 | 1.8 | 60 | 477 | 82.2 | 38.8 | 18.0 |

The results serve to demonstrate that magnetically active material can be produced at the very high $CrO_3:Cr_2O_3$ ratio of 4:1, even when paste water content is also high. Coercivities and surface areas are lower than in Example 2, indicating that this system responds less sensitively to $Sb_2O_3$ than at $CrO_3:Cr_2O_3 = 2:1$. Higher coercivities and surface areas could be obtained by increasing the dosage of $Sb_2O_3$.

As in previous examples, the effect of increasing acetic acid usage is to increase the sensitivity of the system to $Sb_2O_3$. Thus, $CrO_3:Cr_2O_3$ ratio and acetic acid level can be balanced against each other as needed to achieve an appropriate sensitivity of response to $Sb_2O_3$ level.

EXAMPLE 5

Experiments were run as in Example 1 except that acetic acid was used to supply 15% and 20% of the total $Cr_2O_3$ requirement instead of 25%. A very soft chromium dioxide was produced. Samples were stabilized and upgraded as per U.S. Pat. Nos. 3,529,930 and 3,512,930 according to the following procedure:
1. Micropulverizing the dry powder 2. Heating 1 hour at 300° C. with air purge
3. Stirring for ½ hour with sodium sulfite equal to 8% of the weight of $CrO_2$
4. Milling for ½ hour
5. Stirring with another 4% sodium sulfite for a period of 1 hour
6. Filtering, washing, and spray drying The samples were extremely easy to handle during processing and were used to prepare tapes with physical properties very satisfactory for audio, video, and data storage applications, and which exhibited exceptional magnetic performance when tested in audio format.

EXAMPLE 6

Using the procedure of Example 1 and the antimony and iron additions of Example 2; attempts were made to replace acetic acid with propionic, butyric, iso-butyric, oxalic and succinic acids in separate preparations. Only succinnic acid was inactive at the paste stage, and then only if its addition was delayed until the paste cycle was complete and the paste had been cooled to 25°-35° C. The other acids reacted vigorously and were thus not useful for the practice of the present invention. wherein the reducing agent must not react significantly below 100° C.

Chromium dioxide produced with succininc acid functioning in the manner of acetic acid had the following properties:

Hc=499 Oe; $\nu s$=82.4 emu/g; $\nu r$=39.9 emu/g; ssa=32.0 m²/g

EXAMPLE 7

Several compounds considered derivatives or near derivatives of acetic acid were tested for utility. The compounds tested were chromic acetate, $Cr(OAc)_3$; nickelous acetate, $Ni(OAc)_2$; acetamide; and polyacrylic acid. Pastes were made using the general procedure of Example 1 and with the following specific recipe parameters; $CrO_3:Cr_2O_3:H_2O$=2.63:1:1, reducing agent sufficient to produce 25% of the total $Cr_2O_3$ requirement, 0.10% particulate $Sb_2O_3$, and 0.20% $Fe_2O_3$.

Chromic acetate proved to be totally inert, even during the second phase of reduction in the reactor cycle at >100° C. Product properties were generally poor and manifested none of the advantages of the invention.

Nickelous acetate behaved similar to acetic acid and can be considered fully equivalent. Product coercivity and surface area were 491 Oe and 3.3 m²/g, respectively.

Acetamide was moderately active during the paste cycle, resulting in some $CO_2$ generation. It is not a preferred agent, but under certain conditions (e.g., high water levels) the reactivity can be controlled enough to allow its use. In this example, the paste was not converted to product $CrO_2$.

Polyacrylic acid (m.w. 60,000) was highly reactive at the paste stage, causing excessive foaming and eventual solidification of the paste mass.

EXAMPLE 8

Chromium dioxide was produced as in Example 1, except that it was performed on a manufacturing scale using the annular cans of Williston, et al., U.S. Pat. No. 4,045,544. The heat cycle time required to complete the synthesis of $CrO_2$ was 8 hours versus 12 hours for a control paste made by the prior art and without acetic acid. The more efficient heat cycle is due to the exothermic heat of reaction released to the paste as a result of the reduction of $CrO_3$ to $Cr_2O_3$ with acetic acid. This internally released heat allows the paste to reach conversion temperature faster than when the heat is supplied solely by external resistance heat.

The invention provides cycle time efficiencies only for the heating cycle. Thus, both the control and the invention required a further 10 hours to let down the pressure and temperature of the reactor. The total cycle times were therefore 18 hours for the invention and 22 hours for the prior art control.

The product chromium dioxide made by the process of the invention was dramatically softer and more easily processed than the control. It also possessed somewhat lower coercivity and higher surface area. The latter differences were expected, based on the teachings of co-pending application, Ser. No. 845,733, in which crystal aspect ratio is related to $CrO_3:Cr_2O_3$ ratio and in which the nucleation efficiency of $Sb_2O_3$ is improved as a result of a reactor exotherm.

A further advantage of the invention is that the use of expensive, fine grained $Cr_2O_3$ is decreased as it is replaced with the product of the acetic acid-$CrO_3$ reaction. Manufacturing costs are thereby reduced.

We claim:

1. A process for the preparation of ferromagnetic chromium dioxide consisting essentially of:
   (a) forming an aqueous paste containing approximately 100 parts chromium trioxide, 8 to 42 parts chromic oxide, 26 to 56 parts water, and 1 to 7 parts dissolved acetic acid, by weight, and
   (b) heating the paste to a temperature of approximately 300° C. to 400° C. under a pressure of at least approximately 250 atmospheres to form ferromagnetic chromium dioxide.

2. The process of claim 1 wherein approximately 15 to 25% of the chromic oxide present in step (b) is generated in situ by the reduction of chromium trioxide with acetic acid.

3. The process of claim 2 wherein the paste contains approximately 100 parts chromium trioxide, 22 to 32 parts chromic oxide, 30 to 39 parts water, and 1.4 to 2.6 parts acetic acid, by weight.

4. The process of claim 3 wherein antimony oxide is added in step (a) in the amounts of 0.025 to 2.5% by weight of the final chromium dioxide.

* * * * *